June 7, 1966 E. SCHÜLLER 3,255,307

MAGNETIC RECORDER-REPRODUCER HAVING GROOVED TAPE

Filed Sept. 10, 1962 3 Sheets-Sheet 1

INVENTOR
Eduard Schüller

BY Spencer & Kaye
ATTORNEYS

June 7, 1966 E. SCHÜLLER 3,255,307

MAGNETIC RECORDER-REPRODUCER HAVING GROOVED TAPE

Filed Sept. 10, 1962 3 Sheets-Sheet 2

INVENTOR
Eduard Schüller

BY Spencer & Kaye
ATTORNEYS

June 7, 1966 E. SCHÜLLER 3,255,307

MAGNETIC RECORDER-REPRODUCER HAVING GROOVED TAPE

Filed Sept. 10, 1962 3 Sheets-Sheet 3

INVENTOR
Eduard Schüller

BY Spencer & Kaye
ATTORNEYS

United States Patent Office 3,255,307

Patented June 7, 1966

3,255,307

MAGNETIC RECORDER-REPRODUCER HAVING GROOVED TAPE

Eduard Schüller, Wedel, Holstein, Germany, assignor to Telefunken Patentverwertungs-G.m.b.H., Ulm (Danube), Germany Filed Sept. 10, 1962, Ser. No. 222,464
Claims priority, application Germany, Sept. 8, 1961, T 20,724; Sept. 12, 1961, T 20,747
17 Claims. (Cl. 178—6.6)

The present invention relates generally to the recording art and, more particularly, to the recording of broad band signals, wherein there is high relative speed between the record carrier or the magnetic tape and the magnetic head arrangement, such as in arrangements for the magnetic recording of television or video signals and sound or audio signals.

In the scanning of broad band signals for reproduction purposes, it is known to provide a high relative speed between a record carrier and a magnetic head arrangement so that the length of tape will be relatively small or short in order to avoid the necessity for using large and cumbersome reels. In one known device, an attempt is made to fulfill this requirement by providing recording rows disposed substantially at right angles to the travelling direction of the tape. This is accomplished by a magnetic system including four magnetic heads. The system rotates at high speed about an axis which is parallel to the travelling direction of the tape-type recording carrier. A stationary magnetic head is provided for the recording of sound and, in a manner which is known per se, this head records a track close to the edge of the tape while the tape travels from one reel to the other.

However, this type of known device has a number of disadvantages. As an example, the positions of the four rotating magnetic heads have to be adjusted very accurately with respect to each other and they also have to be reset from time to time due to wear. Furthermore, synchronization is very difficult to achieve and requires a considerable amount of electronic parts, in addition to a further track which is lost for useful recording, similar to the sound track provided on a film strip. Due to this, the price of the device becomes extraordinarily high. Furthermore, cutting and gluing of the magnetic tape, that is editing, is a very complicated technique if it is to be done without the loss of synchronization.

Since television signals include frequencies from the lower limit of the audible range to about 5 megacycles, difficulties are also encountered when scanning or reproducing the signals which have been recorded. There are two reasons for these difficulties: (1) the wavelengths which are recorded and which correspond to the low frequencies are so long at the high tape-head speed, that they can no longer be fully detected by the pole shoes of the head; and (2) the voltage which is induced in the scanning or reproducing head is proportional to the frequency and, thus, the low frequencies are handled at a disadvantage. The number of windings on the scanning head could be increased in an attempt to increase the induced voltage at these low frequencies; however, such a measure is limited due to the corresponding decrease in the resonant frequency of the oscillating circuit which is formed by the winding and the winding capacitance. This resonant frequency is to be close to the upper limit of the frequency range.

Because of this, in the known device described above, a carrier frequency is used which is frequency modulated with the broad band frequency spectrum to be transmitted. This modulation is done before recording. Notwithstanding the fact that the expense is considerable, because subsequent to reproduction or scanning demodulation must be carried out, the head-tape speed must be still further increased in order to be able to scan the carrier frequency, which must be higher than the highest signal frequency which is to be recorded.

It is also known to divide the frequency band into a plurality of bands and to record or scan these bands in several tracks extending parallel to the edges of the tape. This was accomplished by using separate stationary magnetic heads. This method was not successful, nor was it widely used in practice because it requires a rather complicated transport mechanism due to the need for extreme accuracy in the tape speed. Such accuracy is very difficult to fulfill and is created because of the high tape speed which is necessary. This, in turn, results in the use of a great deal of tape and thus in the necessity for large and cumbersome reels.

A further disadvantage is that in this arrangement also, a carrier frequency is used which is frequency modulated at least with that channel which contains the lower frequencies. Thus, the magnetic heads can be adjusted to the respective frequency ranges, but there may be a problem due to phase differences which can occur between the channels due to various influences, such as, for example, inaccuracies in the travel of the tape. Such phase differences will change the generally pulse-shaped signal, which is composed of many frequencies, and would thus lead to disturbances in the picture.

With these defects of the prior art in mind, it is a main object of the present invention to provide a simplified tape transport mechanism.

Another object of the present invention is to provide a device of the character described, wherein synchronization is considerably simplified.

Still another object of the invention is to provide a recording arrangement wherein the amount of tape which is used is relatively small and rapid rewinding can thereby be achieved.

A further object of the invention is to provide an arrangement wherein no storage capacity for picture image information is lost.

These objects and other ancillary thereto are accomplished according to preferred embodiments of the invention, wherein at least one rotating magnetic head is provided for the recording of picture signals. The rotation axis of this head is such that the tracks recorded on the tape-type recording carrier are disposed at an angle with the advancing direction of the record carrier, and also at an angle with at least one stationary magnetic head for sound signals which records a track on the record carrier in the travelling direction. In accordance with the present invention a magnetic tape is provided which has grooves arranged inclined or obliquely to the length of the tape. They are constructed so that they correspond to the tracks which are recorded by the rotating head arrangement and guide the pole shoes of this arrangement.

Since the magnetic tape is perforce coupled with the drive for the magnetic head arrangement, due to the grooves, there is a simplification of the means which provide for tape movements. Measures must still be taken to regulate or control the tape feed or tension in the section of the scanning or reproducing point in such a manner that the pole shoes of the head arrangement do not provide too much of a load on the groove walls. If the magnetic tape is guided for 360° around a cylinder carrying the magnetic head arrangement in a manner known per se, and the distance of the grooves is arranged so that it is equal to the pitch of the spiral described by a magnetic head in the loop, then, with a relatively small width magnetic sound tape, tracks sufficiently long to provide one picture or one half of a picture thereon may be recorded. Synchronization in such an event is considerably simplified.

Also, an ideal arrangement is provided for editing, i.e., cutting and splicing, which has not been possible with any of the known processes. Furthermore, stationary pictures or images can be reproduced in a simple manner. The longitudinal or advancing speed of the tape is, for example, only 1% of the head-tape speed and thus the required accuracy of the tape speed (longitudinal) is also small and short rewinding times can be achieved. Furtheremore, an advantageous feature is that the sound recording, and in some cases, if required, control signals, may be recorded on the bridges or elevations formed on either side of the grooves. Such recording can be provided in the longitudinal direction of tape movement so that no storage capacity for picture information is lost.

A further feature of the invention provides a well-adapted embodiment for a scanning or reproducing head which can be used for the scanning of broad band television signals. This head is an annular recording system provided with a winding and is connected with a second annular system also provided with a winding. The connection between the two systems is such that the magnetic circuit of one of the annular systems is closed across the pole ends and the air gap of the other annular system. Also, the rearward or revertive magnetic resistances of the two systems, considered with reference to the effective air gap common to both of them, are arranged to be so different that the magnetic fluxes are distributed between the two circuits in dependence upon the frequency.

Preferably, a soft magnetic material is used as a core for the first system for scanning low frequencies, and a ferrite suitable for high frequencies is used in the other system.

Additional objects and advantages of the present invention will become apparent upon consideration of the following description when taken in conjunction with the accompanying drawings in which.

Figure 5A:
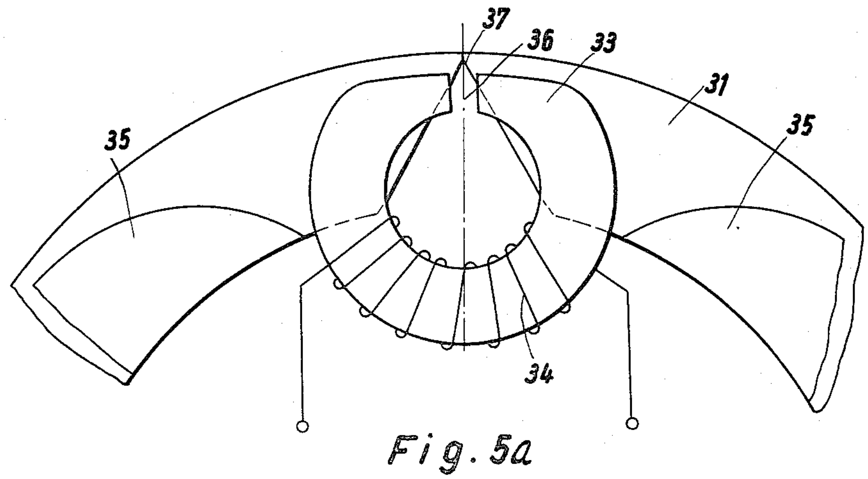
Figure 4:
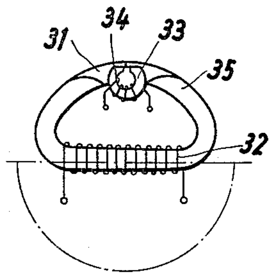
FIGURE 4 is a schematic elevational view of a magnetic head arrangement constructed in accordance with the present invention.

FIGURE 5*a* is an enlarged side elevational view of the air gaps of the head arrangement of FIGURE 4.

Figure 5B:
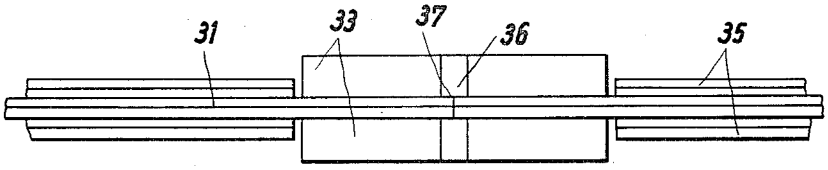

FIGURE 5*b* is a plan view of the structure illustrated in FIGURE 5*a*.

Figure 6:
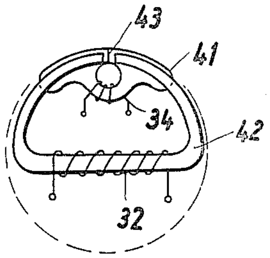

FIGURE 6 is a schematic elevational view of another embodiment of a head arrangement.

Figure 1:
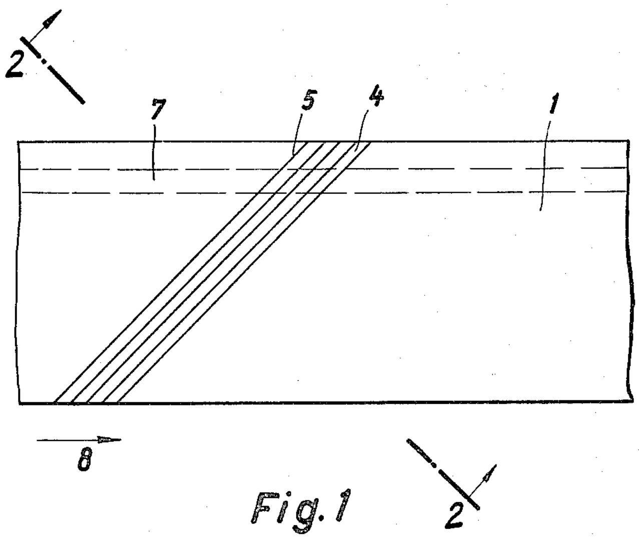
FIGURE 1 is a schematic elevational view of a section of the magnetic tape of the present invention.
Figure 2:
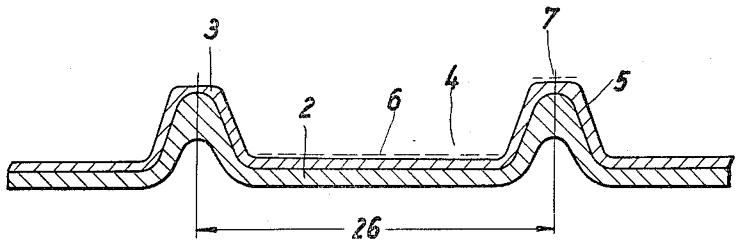
FIGURE 2 is an enlarged vertical sectional view taken substantially along the plane defined by reference line 2—2 of FIGURE 1.

With more particular reference to the drawings, FIGURES 1 and 2 illustrate a magnetic tape 1 which is provided with a carrier 2 and a magnetizable layer 3 thereon, the construction of this tape being that of conventional magnetic tapes. This tape is to be moved in the direction of arrow 8. Elevated or bridge portions 5 are impressed into the tape and are disposed at an angle to the direction in which the tape is to travel, these elevated portions being parallel to and spaced from one another. The particular angle at which these are disposed to the running direction is determined by the drive mechanism which is utilized.

Grooves 4 which may have a depth of about 0.1–0.2 mm. are formed between adjacent elevated or bridge portions 5 which may have a width of about 0.1 mm., and the television picture or image information 6 is recorded on the planar bottom of grooves 4. The bridges 5 guide the rotating magnetic head arrangement which is used with this type of tape. The surfaces of the bridges 5 are also planar and are used for recording the sound information 7. Thus, a track of sound information is provided which extends at an oblique angle to the trapezoidal bridges 5 and parallel to the edge of the tape.

Figure 3:
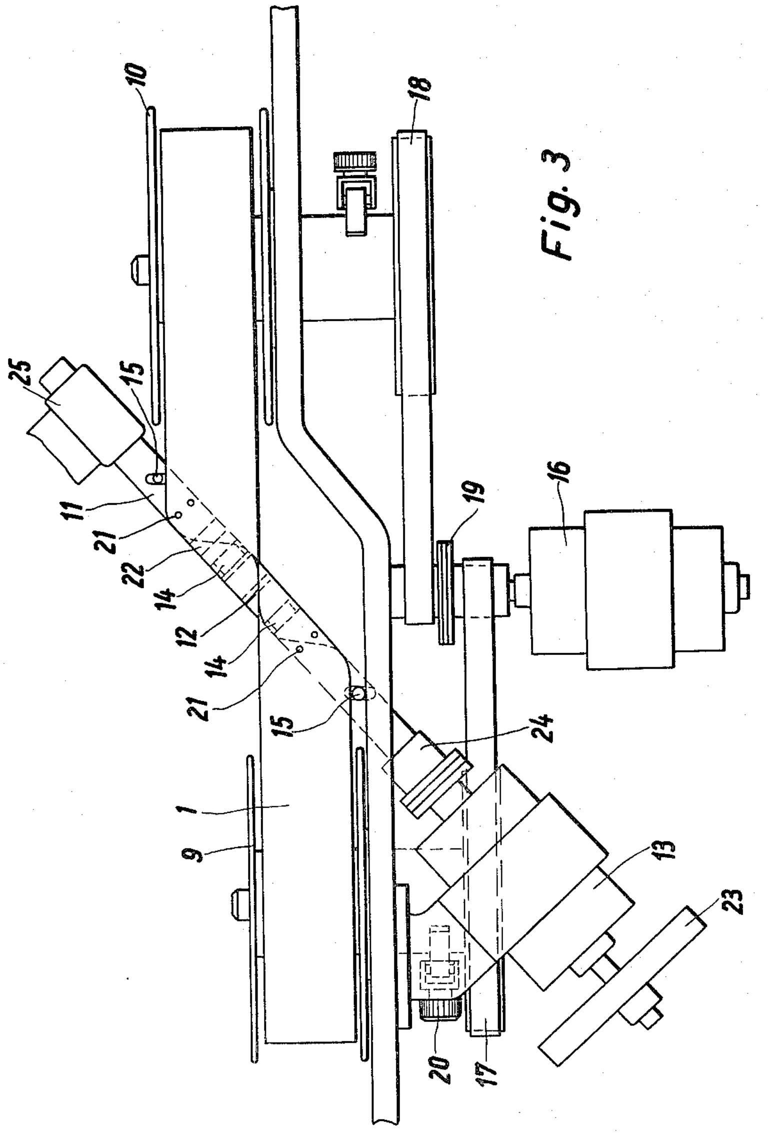
FIGURE 3 is a schematic elevational view of a transport mechanism of the present invention.

FIGURE 3 illustrates an embodiment of a transport mechanism onto which the magnetic tape may be fed from reel 9 during the recording or scanning process and wound onto the reel 10. A hollow cylinder 11 is provided between the reels 9 and 10 and is inclined at an angle of substantially 45° to the direction in which the tape extends between the reels 9 and 10. The tape 1 is wound once about this hollow cylinder. A disc is rotatably mounted within this hollow cylinder and a magnetic head is provided on the periphery of this disc. The magnetic head engages the inner surface of the tape 1 which encircles the cylinder 11, and this engagement of the head with the tape is permitted due to a slot 12 in the cylinder. A flywheel disc 23 and a drive motor 13 are coupled with the magnetic head which is rapidly rotated by the drive motor. The cylinder 11 is divided into two parts by the slot 12 and the cylinder rests in the bearings 24 and 25.

The magnetic head describes a spiral when it is rotating and when the tape 1 is advanced in the loop formed by the guide grooves 4, which are straight when the band or magnetic tape is in its longitudinally straightened condition. The pitch of the spiral is equal to the distance 26 (FIGURE 2) which is the distance between grooves of the magnetic tape 1.

One or more threads 14 are disposed laterally of slot 12 and are disposed on both sides of the head housing, this housing also extending out of the cylinder 11. Because of this construction the transport of the tape 1 by means of the head is even further improved. Rotation of the magnetic head transports the tape corresponding to the pitch of the spiral which is described by the magnetic head, and this transporting takes place with respect to the cylinder 11. Thus, the conventional means for laterally transporting the tape and which includes a drive shaft and a pressing or capstan roller are not necessary. Stops 15 are provided on both sides of the tape to prevent lateral deviation of the tape along the cylinder 11. The stops are movable transversely to the running or transporting direction of the magnetic tape, and, depending upon the position thereof, the control means by which the tape is tensioned e.g. a variable resistor in the feed line of motor 16 may be controlled.

The reels 9 and 10 are driven by means of a regular motor 16 and from belts 17 and 18 connected to a motor shaft. A reversal clutch 19 is provided between the motor shaft and the secondary drive of belt 18. When feeding occurs from left to right, the reel 10 is driven while the reel 9 is decoupled from the motor 16. The control brake 20, for example, may be used to control the feed of the tape and it has an effect on the unwinding reel. The tape feed also is controlled by an arrangement for controlling the movement of rotation of the motor which drives the winding reel.

When it is desired that a rapid or high speed feeding be carried out in one direction or the other, it is necessary to remove or disengage the magnetic tape from the threads 14 of the magnetic head housing and also from the magnetic head. This can be accomplished by providing holes 21 in the hollow cylinder 11 and forcing pressurized air through the holes so that the tape will be blown by the air in a direction away from the cylinder 11. However, if desired a spreading or spacing arrangement which is mounted in the cylinder can be used instead.

In order to provide for scanning and for maintaining an image or picture which is stationary, which is desirable when cutting or the like is done, a separate cylinder may be provided or a cylinder may be used which is exchangeable with the cylinder which is on the device, this second-mentioned cylinder being provided with a magnetic head with a circumference which is sufficiently large that the grooves on the magnetic tape, when the tape is mounted about the head, form circles which close on themselves.

A magnetic head 22 for recording the sound signals is mounted to be stationary in the hollow cylinder 11 and it slides along the bridges 5 formed by the grooves as the tape moves about the cylinder 11. It is advantageous to arrange this magnetic head in the cylinder so that sound which pertains to a picture or image track is recorded approximately vertically or above the center of the picture track. It is also possible to arrange two magnetic heads which operate independently of each other and which are connected in parallel. If these are arranged symmetrically with respect to a center of an image track pertaining thereto and a cut is performed along a groove, an immediate image change takes place at the place where gluing or splicing has occurred while the sound of the old and the sound of the new picture image recordings are blended and mixed with each other. However, it is also possible to cut at great angles to the advancing direction and in this case a sudden change of sound will occur while the pictures or images of the old and the new picture information are blended and mixed together. In each case cutting is simple since the synchronization can be easily restored by using optical observation when gluing and such synchronization is made simpler because of the grooves.

FIGURES 4, *5a* and *5b* illustrate details of a magnetic head including a system 31 used for scanning the low frequencies and which is constructed of one or several laminates of soft magnetic material which may have a diameter of about 20–30 mm. The dimensions are such that the outer surface, which is at right angles to the plane of the laminates, forms approximately half of the body of rotation which touches the magnetic tape when the device is in operation. Due to the large loop which is provided the scanning of large band or tape wavelengths is possible.

The yoke of this system 31 is provided with a winding 32 of about 10 kilo ohms having a large number of coils which is such that the resonant frequency of the oscillation circuit formed by the winding and the winding capacity is disposed in the vicinity of the limit frequency of the channel containing the low frequencies, for example, at 20 kilocycles. A window (not shown) may be provided in the yoke in a manner which is known per se. This window may carry an auxiliary winding provided with such a current that the portions of the yoke around which it is wound are magnetized to saturation. Then, if a magnetic flux occurs through the head because of a magnetic field present at the gap, this flux will occur through the magnetic auxiliary circuit connected between the head halves, and even numbered harmonics are created in the auxiliary circuit which pass to the main circuit and induce a voltage in winding 32. Thus, with the use of this system, frequencies down to the values of zero may be scanned.

Because of the eddy currents which take place in the soft magnetic material, the high frequencies pass on to the system 33 which includes a ferrite suitable for high frequencies and is also ring shaped, but it is substantially smaller in dimensions than the system 31. The high frequency system 33 is constructed of two congruent portions and extends substantially only over the pole ends of system 31. These pole ends are chamfered or sloped toward the interior. The gap 36 of system 33 is disposed parallel to the gap 37 (about 1–2 $\mu$m wide) of system 31 and is broader (about 20–30 $\mu$m wide) than the latter gap. The high frequency system 33 having an outer diameter of about 5 mm. is provided with a winding 34 containing only a few coils (about 100 windings) and is tuned to approximately the upper limit frequency of the channel containing high frequencies which may be, for example, two megacycles.

During the scanning of the magnetic tape, the flux passes across the operating air gap 37 which is common to both systems and into the magnetic circuits. It is divided between the two systems on the basis of the rearward or revertive magnetic resistances which are different when considered with respect to the gap 37 as they depend on frequency. Dut to the high permeability of material 31, the magnetic resistance of low frequency system 31 is maintained small outside of the system 33 at low frequencies. Another magnetic head is illustrated in FIGURE 6 using the same principles as the head which is illustrated in FIGURE 4. However, in this construction the advancing or moving surface which is disposed against the recording carrier or the magnetic tape is provided with an air gap 43 and is represented by a system 41 which is of ferrite, while the system 42 comprises a soft magnetic material and serves to scan the low frequencies. This system is set back from the first and includes a system 41 between its laminates.

The magnetic head arrangements which are described above may be used in all systems in which broad band signals are to be utilized. However, these novel arrangements are particularly useful in devices constructed in accordance with that of FIGURE 3 in which the magnetic head arrangement rotates in a cylinder and wherein the cylinder is encircled by a magnetic tape, the tape running onto the cylinder in an oblique direction and extending about it for 360°. The reason for this is that the pole surfaces adjacent the air gap always lie against the magnetic tape for all of their length and can be constructed sufficiently large so as to be able to scan large wavelengths.

It will be understood that the above description of the present invention is susceptible to various modifications, changes, and adaptations, and the same are intended to be comprehended within the meaning and range of equivalents of the appended claims.

What is claimed is:

1. A device for the magnetic recording of television picture signals and television sound signals, comprising at least one rotating magnetic head for recording picture signals, the axis of rotation of said head being such that the tracks recorded on the tape-type recording carrier form an angle with respect to the advancing direction of the recording carrier, at least one stationary magnetic head for sound signals which head records a track on the recording carrier in the transport direction, and a magnetic tape having grooves arranged to be inclined to the tape in such a manner and dimensioned such that they correspond to the tracks recorded by the rotating head and guide the pole shoes of the rotating head.

2. A device for recording and reproducing television picture and sound signals, comprising in combination:
- (A) a magnetic tape having grooves formed therein in a direction inclined with respect to the longitudinal length of the tape; and
- (B) a tape transport mechanism including
  - (1) means for feeding the tape, and
  - (2) means cooperable with the tape for recording and reproducing signals, said means including
    - (a) at least one rotatable magnetic head for picture signals having an axis of rotation disposed at an angle with the tape feeding direction to provide tracks on the tape which are disposed to correspond with the inclined grooves for guiding the pole shoes of said head, and
    - (b) at least one stationary magnetic head for sound signals arranged to provide tracks on the tape in the feeding direction.

3. A device as defined in claim 2 wherein the feeding speed of the magnetic tape and the rotating speed of the magnetic head are arranged so that, with a given breadth of the magnetic tape, at least a half-picture is recorded by the stationary magnetic head in one track.

4. A device as defined in claim 3 wherein said mechanism includes a cylinder about which the magnetic tape is guided at an angle of 360°, said heads being mounted on said cylinder, and the spacing of the grooves being equal to the pitch of a spiral described by each magnetic head in the loop.

5. A device as defined in claim 4 wherein said cylinder is hollow, said rotatable magnetic head rotating therein, said cylinder having a slot through which the rotatable magnetic head touches the inner surface of the encircling magnetic tape.

6. A device as defined in claim 5 wherein said mechanism includes a housing in which said rotatable head is mounted, and at least one thread on the rotatable magnetic head housing and disposed laterally of the magnetic head.

7. A device as defined in claim 6 wherein said mechanism includes movable stops which guide the magnetic tape at its edges, and contacts actuated by said stops for controlling the pull of the tape in such a manner that the magnetic tape always runs at the same height on the cylinder.

8. A device as defined in claim 6 comprising means for disengaging the magnetic tape from the threads when the feeding means is speeded up.

9. A device as defined in claim 8 wherein said disengaging means include a spreading arrangement mounted on the cylinder.

10. A device as defined in claim 8 wherein disengagement is effected by means of pressurized air streaming out of the cylinder against the magnetic tape.

11. A device as defined in claim 2 wherein said recording and reproducing means includes means for scanning a single track when the magnetic tape is stationary.

12. A device as defined in claim 11 wherein said single track scanning means include an additional cylinder, said additional cylinder being provided with a magnetic head and having a circumference so large that the grooves on the magnetic tape form circles which are closed upon themselves.

13. A device as defined in claim 2 wherein the magnetic head used for the recording of the sound signals is arranged to slide along bridges formed by the grooves and describes a track which is parallel to the edge of the tape.

14. A device as defined in claim 13 wherein the magnetic head for sound signals is mounted in the cylinder to record the sound pertaining to a picture track approximately vertically above the center of the picture track.

15. A device as defined in claim 13 wherein there are two magnetic heads for sound signals arranged symmetrically to the center of a pertaining picture track, said magnetic heads being arranged to operate independently of each other.

16. A device for recording and reproducing television picture and sound signals, comprising, in combination:

(A) a magnetic tape having grooves formed therein in a direction inclined with respect to the longitudinal length of the tape; and (B) a tape transport mechanism including (1) means for feeding the tape, and (2) means cooperable with the tape for recording and reproducing signals, said means including (a) first and second removable cylinders, (b) at least one rotating magnetic head mounted in said first cylinder for picture signals having an axis of rotation disposed at an angle with the tape feeding direction to provide tracks on the tape which are disposed to correspond with the inclined grooves for guiding the pole shoes of said head, (c) a further magnetic head mounted in said second cylinder and having a head with a circumference so large that the grooves on the magnetic tape form circles which are closed upon themselves, said first and second cylinders being usable one at a time, and (d) at least one stationary magnetic head for sound signals arranged to provide tracks on the tape in the feeding direction.

17. A magnetic carrier for use with a device for recording and reproducing television picture and sound signals and including a tape drive and a rotating magnetic head whose axis is disposed at a predetermined angle with respect to the direction of tape travel, said carrier comprising a magnetic tape having grooves formed therein and inclined with respect to the longitudinal direction of the tape at the predetermined angle so that the grooves may guide the pole shoes of the head.

References Cited by the Examiner

UNITED STATES PATENTS

| | | | |
|---|---|---|---|
| 2,594,893 | 4/1952 | Faus | 179—100.2 |
| 2,964,324 | 12/1960 | Brasseur | 179—100.2 |
| 2,968,702 | 1/1961 | Fay | 178—6.6 |
| 2,976,354 | 3/1961 | Banning | 178—6.6 |
| 3,020,359 | 2/1962 | Pfost | 179—100.2 |
| 3,046,359 | 7/1962 | Warren | 179—100.2 |

DAVID G. REDINBAUGH, *Primary Examiner.*

H. W. BRITTON, *Assistant Examiner.*